May 21, 1935.  A. R. LE MOON  2,002,152
AXLE MOUNTING
Filed Oct. 23, 1933   2 Sheets-Sheet 1

Witnesses:
Harry R. L. White
Robert Cremer

Inventor:
Axel R. Le Moon
By Rummler, Rummler
& Woodworth  Attys.

May 21, 1935.  A. R. LE MOON  2,002,152
AXLE MOUNTING
Filed Oct. 23, 1933   2 Sheets-Sheet 2
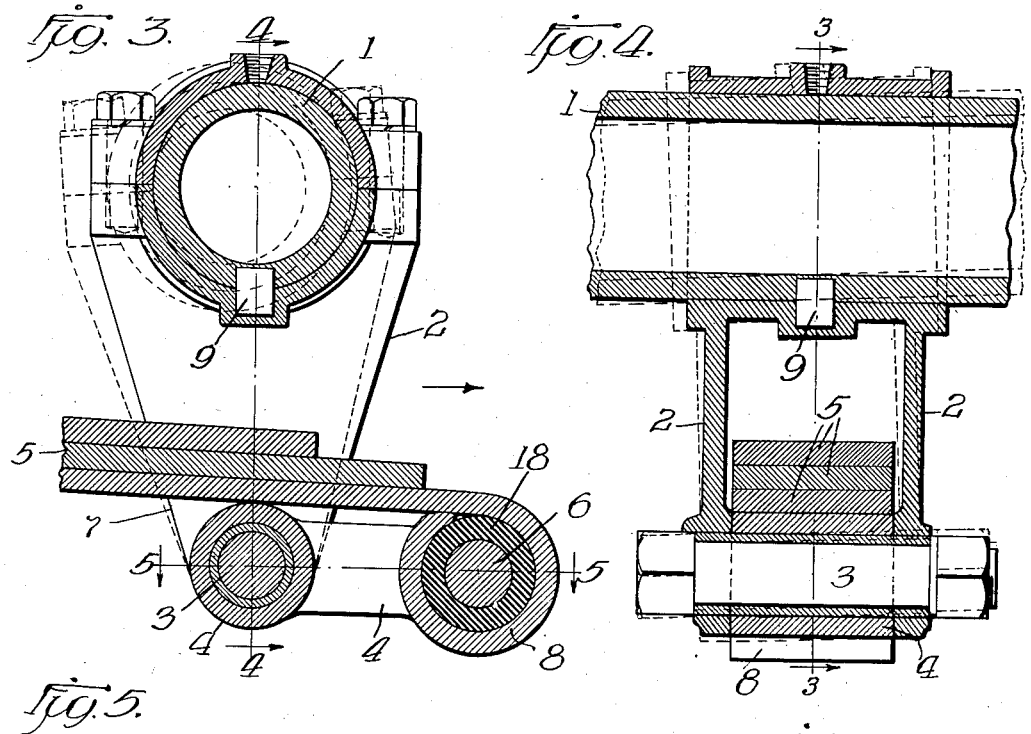
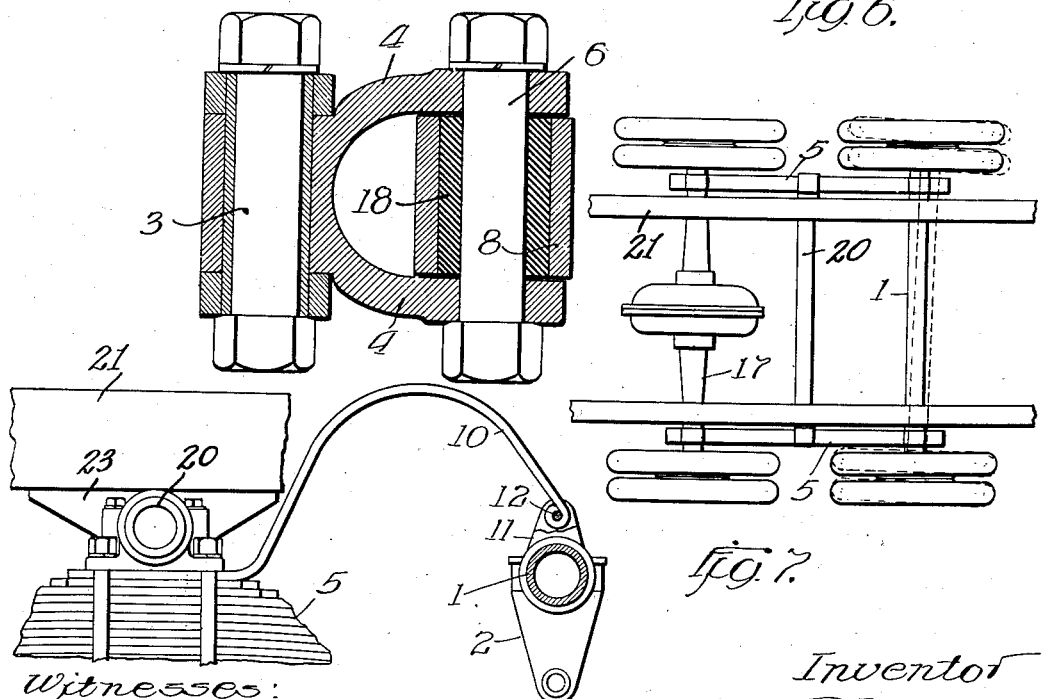
Inventor
Axel R. Le Moon Patented May 21, 1935

2,002,152

UNITED STATES PATENT OFFICE 2,002,152

AXLE MOUNTING

Axel R. Le Moon, Chicago, Ill., assignor to Nelson-Le Moon Truck Company, Chicago, Ill., a corporation of Illinois Application October 23, 1933, Serial No. 694,793

7 Claims. (Cl. 267—41)

This invention relates to load supporting axles for vehicles. It is useful in various connections such as an additional axle for a motor truck when there is need to increase the load carrying capacity of a standard truck and perhaps incidentally lengthen its frame, or for use as supporting axles for trailers, railroad cars or other similar load carrying constructions.

One of the purposes of the invention is to provide an axle construction having depending load supporting elements providing a pivot, for the axle, spaced downwardly from the axle and arranged therewith to permit the axle to rock in a fore-and-aft direction with reference to the vehicle frame, whereby a fixed relationship between the axle and the frame in such direction is avoided, and the axle may give forwardly or rearwardly as resisted by the weight of the load and thus permit better performance in climbing forwardly or backwardly over obstructions, and utilizing the resilient restoring action of the load on the axle for carrying out the desired action.

Another purpose of the invention is to provide an improved supporting spring connection between the axle and the load carrying frame affording protection for the spring, and enabling the spring to take excess loads over the normal maximum capacity for which it was designed.

Another object of the invention is to provide a simple axle mounting design having inherent therein a tendency due to the weight of the load to set in transverse position with reference to the vehicle frame while having a shifting capacity against the reaction of the load for adjusting itself to the radius of the curve of the track of the vehicle when making a turn.

A further purpose of the invention is to provide, in an axle construction of this class, a depending coupling arrangement with a supporting spring for the vehicle permitting the necessary tilting of the axle without twisting the spring and at the same time allowing the axle to come into radial position with reference to track curves.

The objects of the invention are accomplished by means of the construction such as illustrated in the accompanying drawings, in which:

Fig. 3 is a detail in vertical section transversely through the axle, axle pad, spring and shackle, as indicated by the line 3—3 of Fig. 4.

Fig. 4 is a sectional detail as indicated by the line 4—4 of Fig. 3.

Fig. 5 is a sectional view through the spring shackle as indicated by the line 5—5 of Fig. 3.

Fig. 6 is a fragmentary diagrammatic plan showing the supplemental axle shifted with reference to a driving axle to conform to the radius of a curve upon which a vehicle may be turning.

Fig. 7 is a detail for showing mechanical means for adding resistance to displacement of the axle in addition to the resistance normally provided by the load carried by the axle.

Figure 1:
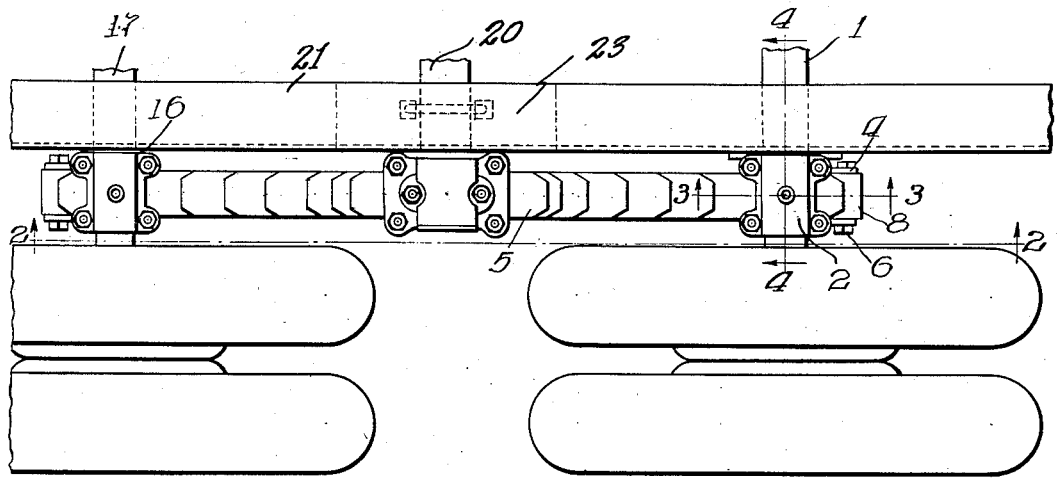
Figure 1 is a fragmentary plan view illustrating the relationship between axles, spring, wheels and frame.

One use of the construction to which this invention relates is for economically increasing the load carrying capacity of a truck, and utilizing the same springs which are between the drive axle and the frame for cushioning both the drive axle and the added axle. This is done by placing the additional axle rearwardly of the drive axle and connecting the two with the springs, and by centrally clamping the springs to the under side of the frame.

The shackle connections between the axles and the ends of the springs are such as to provide bearing points for the springs which are spaced inwardly from the spring eyes, and shorten the effective length of the springs for heavy loads.

This arrangement also may be used on trailers where none of the axles is a drive axle.

Fig. 3 shows the essentials of the new construction. The numeral 1 indicates a dead axle tube, or an axle which has the sole function of supporting a load. It does not turn on its axis as it has clamped thereto depending castings 2, which, through the transverse bolts 3 below the axle, support shackles 4 for the load carrying spring 5. The spring eye bolt 6 of the shackle is parallel to the bolt 3 but spaced several inches horizontally therefrom. The spring rests upon the shackle at the fulcrum point 7 and thus the main leaf of the spring is reinforced by additional leaves at the point of the support. The effective strength of the spring is thus increased and its load carrying capacity increased accordingly.

The center of pressure of the load is directly beneath the axis of the axle and in this manner the axle is restrained from moving away from its centered position by the weight of the load. It may, however, give in fore-and-aft direction against the restoring action of the load, and this feature lessens unnecessary rigidity, the value of which is apparent through use of the vehicle, for instance in backing it up over an obstruction. By means of it the vehicle can get up over an obstruction which would positively stop it were the axle fixed against fore-and-aft movement.

Shackle bolt 6 loosely fits the spring eye 8 in order to permit the lateral tilting of the axle castings 2 and shackles 4, without unduly twisting the springs or the space between the spring eye and the shackle bolt 6 is filled with a rubber or other resilient bushing 18. In this design the spring eye shackle bolt is a connecting pivot but does not function in the usual way of supporting the load.

This arrangement also permits the axle to shift and turn slightly on the fulcrums 7 to adjust itself into a horizontal angle with the drive shaft so as to be somewhat out of parallelism therewith when the vehicle is traveling in a curved path.

Figure 3 illustrates by the shifted broken line position of axle 1 and axle pad casting 2 how this unit may swing away from its normal position around bolt 3, and Figure 4 shows by broken lines how the unit may tilt with reference to the spring 5 such as when one wheel rises over a bump or drops into a depression. At such time the resilient bushing 18 is distorted.

The axle casting is clamped to the axle and made rigid therewith by dowel pin 9.

In some cases for light constructions and light loads, it may be desirable to add resistance other than the load to fore-and-aft shifting of axle 1, and this is done by any resilient connection beween the vehicle frame structure and the axle. A preferred construction for this purpose is illustrated by Fig. 7. In that detail the axle pad casting 2 is provided with upwardly extending ears 11 which carry a spring bolt 12. A bowed, looped, or partially looped spring leaf 10 has an eye at one end encircling the bolt 12, and at its other end is clamped to the supporting spring 5. The latter may be either rigidly or pivotally connected with the vehicle frame.

Figure 2:
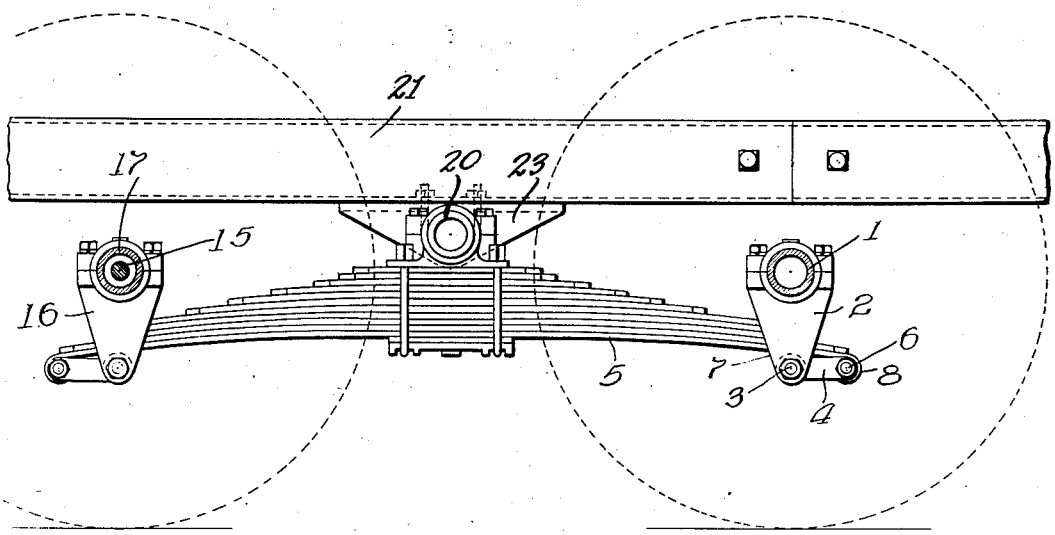
Fig. 2 is a side view of the fragmentary construction shown in Fig. 1, parts being shown in section.

Figs. 1 and 2 show the above described axle mounting at each end of spring 5, and there need be no variation from this construction except where one of the axles is a driving axle. Such a driving axle is indicated at 15, Fig. 2. In that case the axle pad casting 16, instead of being clamped to the axle, is fitted to the axle housing 17 so as to be free to rotate thereon. Dowel pin 9 of Figs. 3 and 4 is then omitted and there is a slight difference in machining the axle pad casting so that it may swing on axle housing 17. Otherwise the spring connection is the same at both ends.

The wheel bearings on the non-rotating axle 1 may be fitted to spindles carried at the ends of the tube.

The springs 5 are centrally journaled on the ends of a transverse frame reinforcing tube 20, which is secured to the vehicle frame 21 by clamping brackets 23.

In the operation of the improved axle mounting, referring to Fig. 2, it may be assumed that the axle 15 and its housing 17 are part of the standard drive construction for the vehicle and have no fore-and-aft movement. However, the depending bracket 16 with its shackle connection to the end of the spring serves to afford a spring fulcrum spaced inwardly from the end of the spring, and thus make the spring serviceable for heavier loads than without this fulcrum support.

The rear axle tube 1 ordinarily is held equally spaced from the center of spring 5 by its bracket and shackle connection with the spring and by the load which it carries bearing against the shackle 4 at the fulcrum point 7 directly beneath the center line of the axle. When the wheels of axle 1 encounter undue resistance the axle may shift in a fore-and-aft direction, but always being restored or urged back to its normal position from the fact that the load is suspended directly beneath the axle. This simple construction also permits the necessary lateral tilting of the axle without unduly twisting the springs, since the spring eye is large enough to move on the shackle bolt 6. For the same reason the axle may adjust itself to the radius of the path of the vehicle when on a curved course. Both of the latter movements are cushioned by rubber bushings 18.

Although but one specific embodiment of the invention is herein shown and described, it will be understood that details of the construction may be altered or omitted without departing from the invention as defined by the following claims.

I claim:

1. In a vehicle, an axle having depending elements constructed to afford a rest or fulcrum for a load carrying spring, a frame structure, a spring extending from said frame structure over said fulcrum, and a shackle connecting the end of the spring with said depending element.

2. In a vehicle, a frame structure, a spring centrally clamped to said frame structure, shackles pivotally connected to the ends of the spring and extending inwardly beneath the spring and providing spring bearings spaced inwardly from the ends of the springs, axles placed above the springs and having depending elements connected with the shackles below the spring bearings.

3. In a vehicle a frame structure, a spring centrally clamped to said frame structure, shackles pivotally connected to the ends of the spring and extending inwardly beneath the spring and providing spring bearings spaced inwardly from the ends of the spring, axles placed above the spring and having depending elements connected with the shackles below the spring bearings, one of said axles being free of restraining connections with said frame except through its shackle and spring connection therewith.

4. A construction of the class described comprising an axle, a depending axle pad rigidly secured to said axle, a spring rest carried by said pad beneath the axle, a spring passing over said spring rest and a shackle connection extending from one end of the spring to said depending axle pad.

5. A construction of the class described comprising an axle, a depending axle pad rigidly secured to said axle, a spring rest carried by said pad beneath the axle, a spring passing over said spring rest and a shackle connection extending from one end of the spring to said depending axle pad, and resilient means for restraining said axle and axle pad from rocking around said spring bearing.

6. A construction of the class described comprising an axle, a depending axle pad rigidly secured to said axle, a spring rest carried by said pad beneath the axle, a spring passing over said spring rest and a shackle connection extending from one end of the spring to said depending axle pad, and a bowed spring leaf for restraining said axle and axle pad from rocking around said spring bearing.

7. A wheeled supporting axle for a vehicle having a depending element to which is pivoted beneath the axle a spring shackle, said shackle carrying spaced from said pivot a spring bolt, a cushioning bushing surrounding said spring bolt, a vehicle supporting leaf spring resting upon the pivot of the shackle and having one leaf provided with an eye at its end which encircles the cushioning bushing.

AXEL R. LE MOON.